(12) United States Patent
Nose

(10) Patent No.: US 6,181,041 B1
(45) Date of Patent: Jan. 30, 2001

(54) INDUCTANCE ROTATING ELECTRIC MACHINE

(75) Inventor: Tamotsu Nose, Nagano (JP)

(73) Assignee: Sankyo Seiki Mfg. Co., Ltd., Nagano-ken (JP)

(*) Notice: Under 35 U.S.C. 154(b), the term of this patent shall be extended for 0 days.

(21) Appl. No.: 09/162,233

(22) Filed: Sep. 28, 1998

(30) Foreign Application Priority Data

May 14, 1998 (JP) .................................................. 10-132234

(51) Int. Cl.[7] ..................................................... H02K 1/06
(52) U.S. Cl. ........................ 310/164; 310/216; 310/218; 310/254; 310/166
(58) Field of Search ................................... 310/164, 216, 310/217, 218, 210, 254, 258, 166

(56) References Cited

U.S. PATENT DOCUMENTS

| 3,187,211 | * | 6/1965 | Nard | ...................................... | 310/166 |
|---|---|---|---|---|---|
| 3,495,109 | * | 2/1970 | Ames | .................................... | 310/216 |
| 5,194,775 | * | 3/1993 | Cooper | .................................. | 310/260 |
| 5,306,976 | * | 4/1994 | Beckman | ............................. | 310/215 |
| 5,798,583 | * | 8/1998 | Morita et al. | .......................... | 310/42 |

FOREIGN PATENT DOCUMENTS

| 634102 | * | 1/1962 | (CA) | .................................... | 310/164 |
|---|---|---|---|---|---|
| 55-162862 | * | 12/1980 | (JP) | ..................................... | 310/166 |
| 3-285541 | * | 12/1991 | (JP) | ..................................... | 310/166 |

* cited by examiner

*Primary Examiner*—Nestor Ramirez
*Assistant Examiner*—Burt Mullins
(74) *Attorney, Agent, or Firm*—Reed Smith LLP

(57) ABSTRACT

An inductance rotating electric machine comprises a primary armature having a core that includes a core winding portion, a coil wound within a slot and a facing core portion. The facing core portion faces a secondary armature at a projection end of the core winding portion. The facing core portion has a core height which is higher than that of the core winding portion.

17 Claims, 10 Drawing Sheets

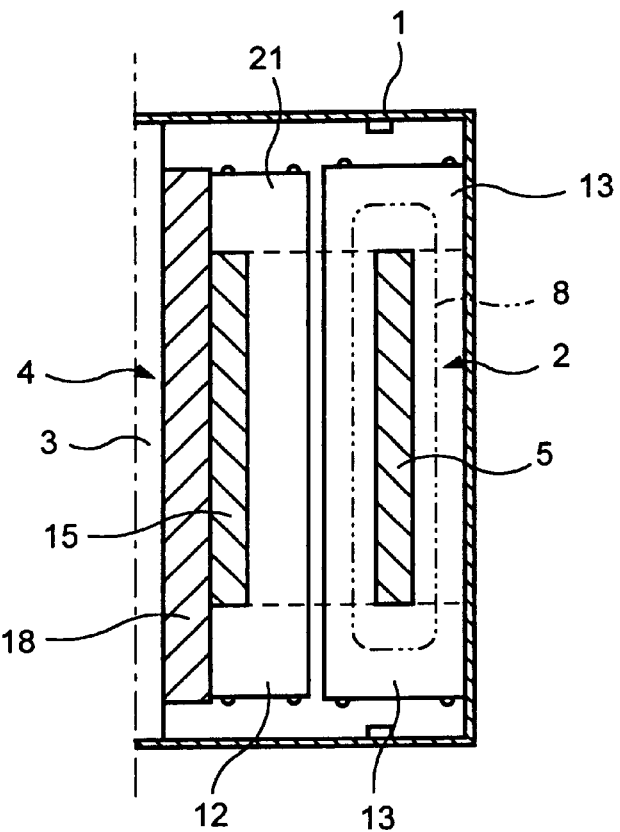
F I G. 1
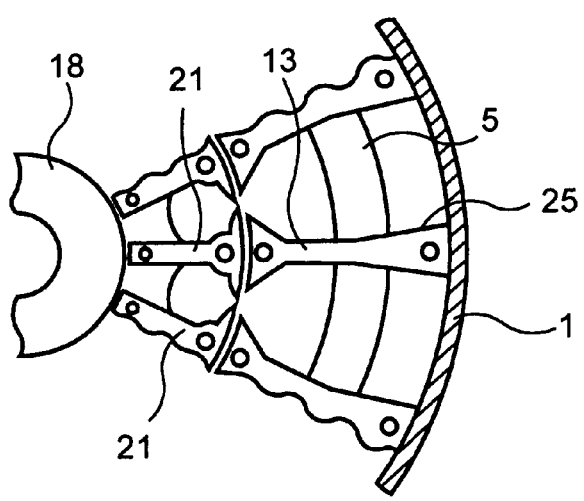
F I G. 2

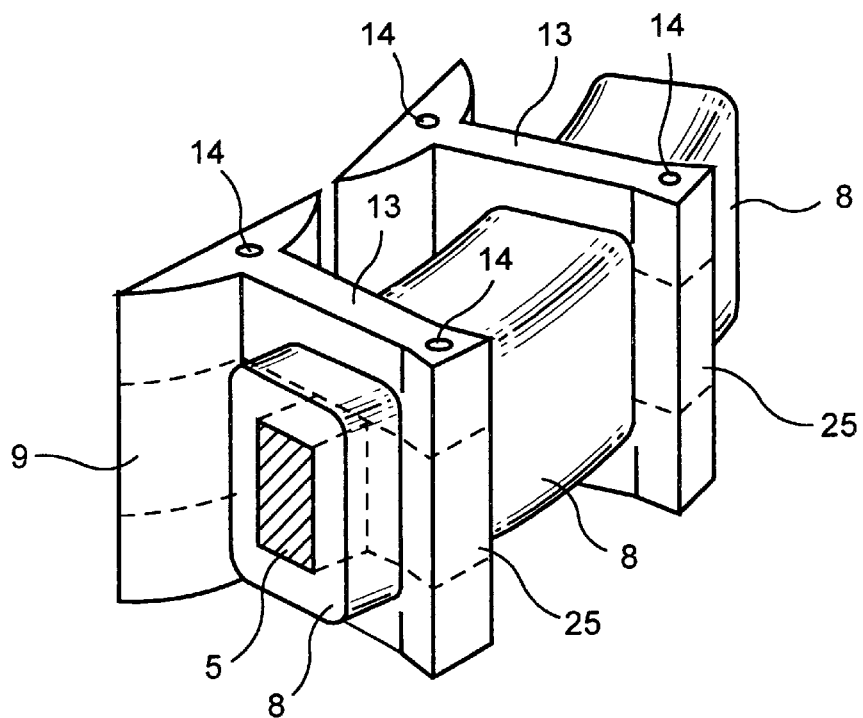
F I G. 3
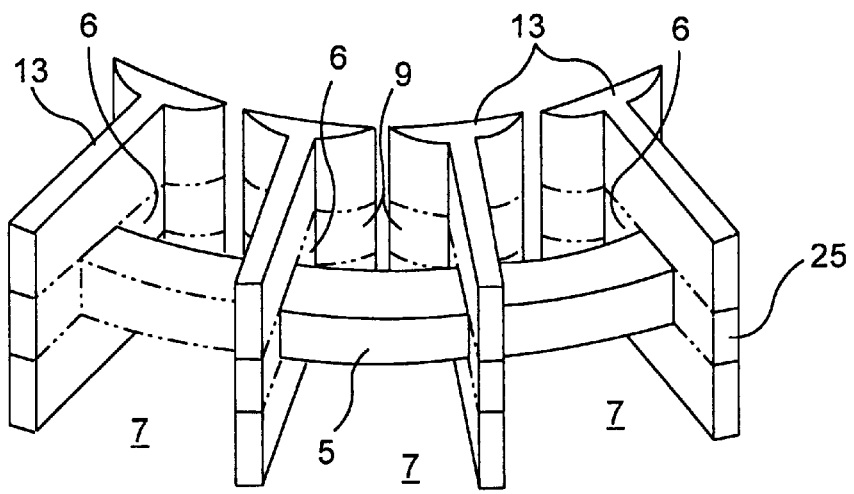
F I G. 4

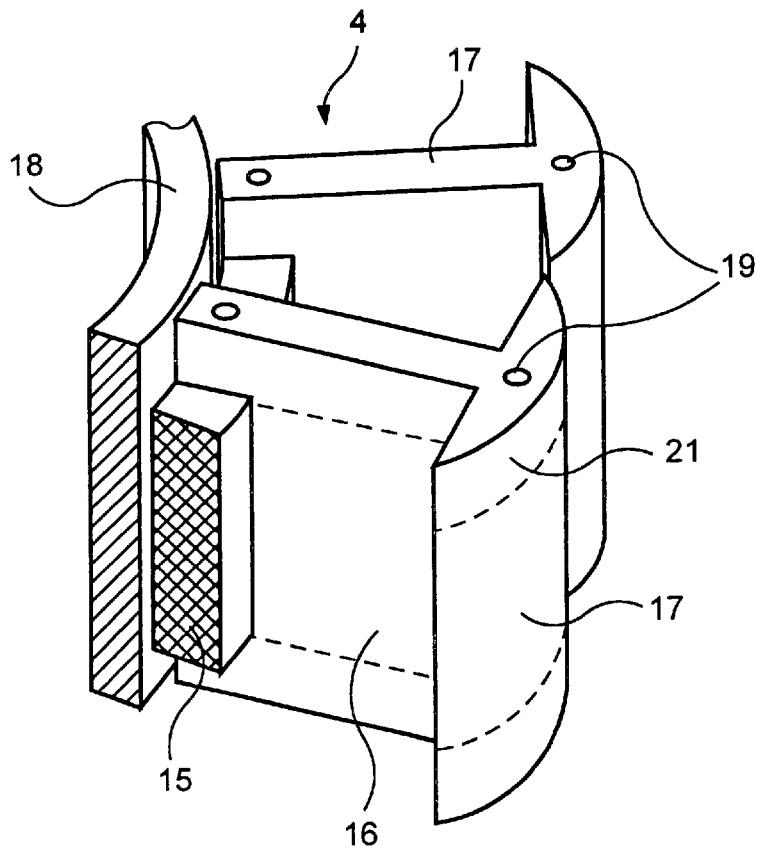
F I G. 7
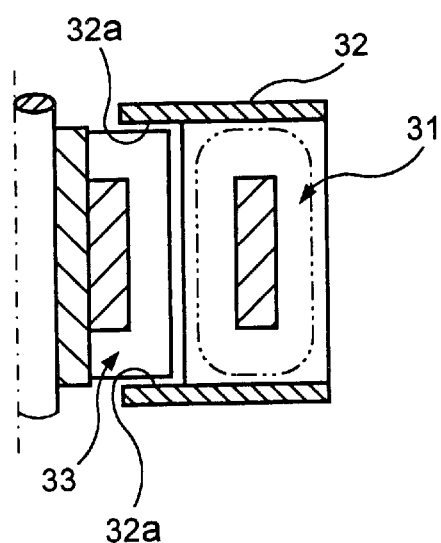
F I G. 8

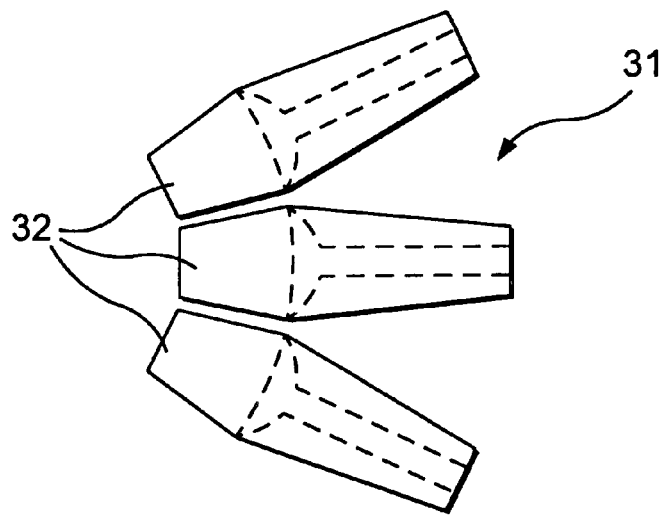
F I G. 9
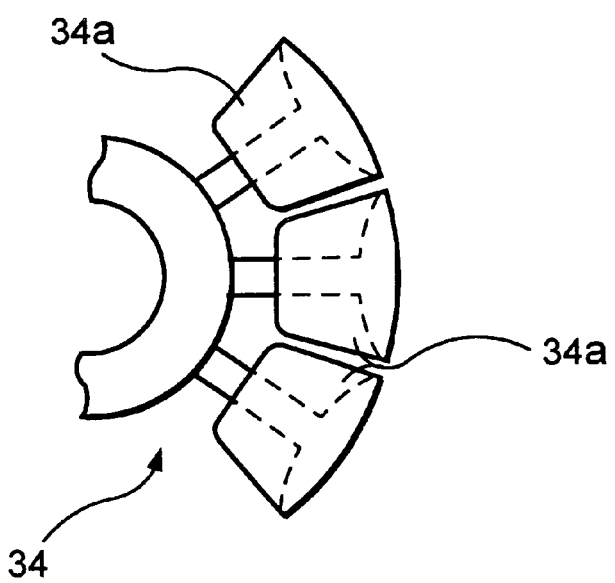
F I G. 10

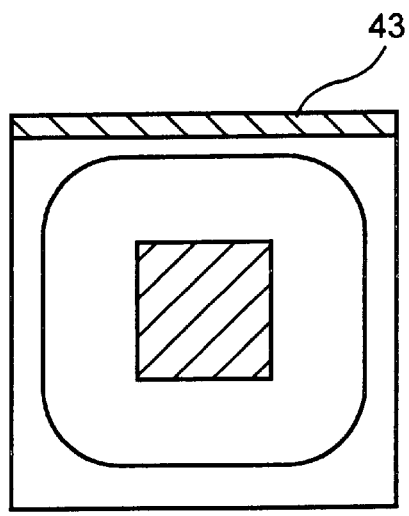
F I G. 11
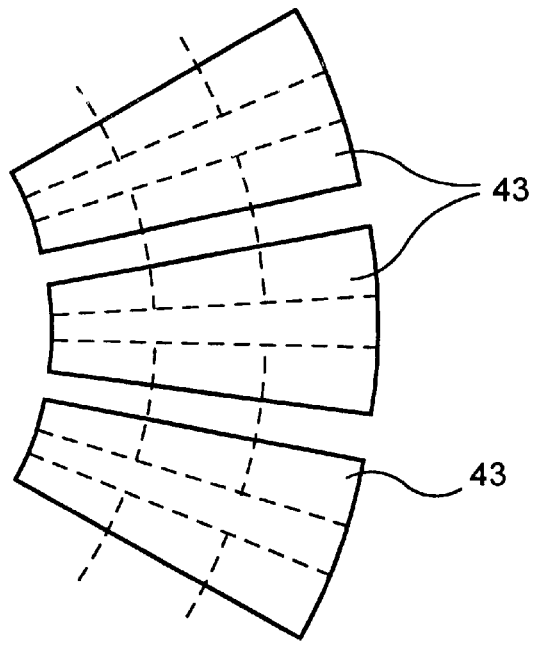
F I G. 12

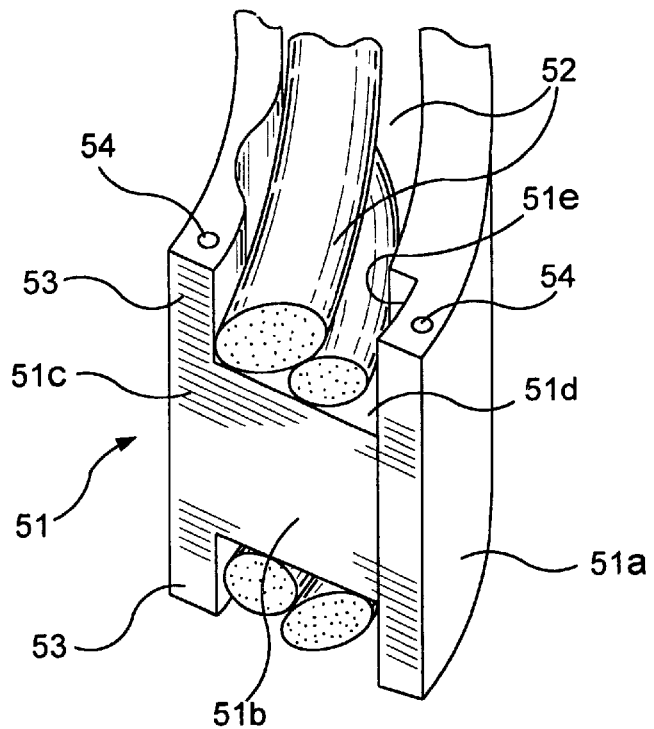
F I G. 13
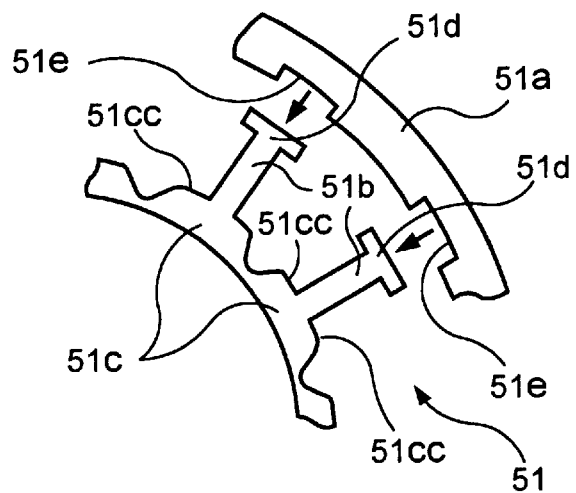
F I G. 14

INDUCTANCE ROTATING ELECTRIC MACHINE

BACKGROUND OF THE INVENTION a) Field of the Invention

The present invention relates to an inductance rotating electric machine used as motors or generators.

b) Description of the Related Art

Generally, a rotating electric machine that needs sine waveform magnetic field in an air gap portion employs a distributed winding as a winding method. For example, in an inductance motor illustrated in FIGS. 18 and 19, a stator S is arranged to surround an outer circumference of a rotor R, and core portions SC1 that extend radially in a rib-shape are formed at a laminated core of an armature constituting the stator S. A coil SL is superposed shifting slot SC2 created between the radial rib-like core portions. This method in which the coil SL is superposed shifting the slots, however, makes it difficult to wind the coil and also requires longer winding. Thus, the winding height H1 may be higher.

Global environmental issues have become serious recently, requiring energy-saving and power-saving as a first priority. Environmental issues are especially dominated by the issue of power consumption, and motors consume more than half of the available power. For this reason, it is very important to increase motor efficiency and decrease loss (of power) as much as possible. Also, the same consideration is given to generators that generate electric power.

OBJECT AND SUMMARY OF THE INVENTION

A primary object of the present invention is to provide an inductance rotating electric machine in which the efficiency value is greatly improved by, for a high property, modifying an armature that has a winding at a core winding portion thereof.

The present invention relates to a property-improved structure of the rotating electric machines including motors and generators. Motors convert electrical energy to mechanical energy; generators convert mechanical energy to electrical energy. Therefore, motors and generators are basically the same in structure and configuration. It is, therefore, possible to use a motor as a generator, and vice versa. For this reason, all the following description will be referred to a motor.

Generally, output and torque are used as an index of the motor's property. However, the motor's property cannot be expressed in an absolute value by the above indices because the output and torque vary depending on applied voltage, the number of windings, radiating condition, design, etc. The efficiency value is another index of the motor's property which properly expresses the relationship between the output and the loss. However, efficiency value also varies depending on loads or the number of rotations, and therefore, with the initial zero output, the efficiency value is also zero. This also cannot be an absolute index to express the motor's property.

To improve the efficiency value of a motor, it is a basic to understand what the motor's property is, what the efficiency is, and how they are determined. As a result of studies done by the present inventor, the following was understood.

The absolute index of the motor's property is a proportional constant that expresses (determines) the relationship between the torque generated and the loss (copper loss) caused. In an inductance motor, the proportional constant equals torque/copper loss. In other words, the proportional constant that expresses the relationship between the torque and the copper loss caused when the current is applied never changes even when the applied voltage, the number of windings (with the same space factor), and the load condition are changed. Thus, it is understood that this proportional constant is an absolute index that expresses the motor's property.

Also, the efficiency value is output/input=output/(output+loss), where the output is the number of rotations x torque, the number of rotations can be expressed by the applied voltage and the loss, and the loss mainly means the copper loss. Therefore, it is understood that the efficiency value is mostly determined by the proportional constant.

To enhance the motor's property (to increase the efficiency), various attempts have been made, such as making large motors and increasing the space factor of the winding. However, the motor's property is enhanced by changing the condition of factors that determine the proportional constant.

Next described are the reasons why this proportional constant value determines the absolute index of the motor's property and the factors that determine this proportional constant value.

The magnitude of the motor torque depends on the amount of the change in magnetic energy caused by relative move between the primary and secondary sides (currents) which are placed opposite one another. There are two kinds of magnetic energies: one generated and retained by a self-inductance L between the primary and secondary sides (currents); the other generated and retained by a mutual-inductance M between the primary and secondary sides (currents). Which magnetic energy is used for driving depends on the type and structure of the motor. Inductance motors use the magnetic energy caused by M.

When the configuration such as the number of magnet poles is set, the magnitude of the torque generated at primary and secondary currents $I_1$ and $I_2$ is mostly determined by the maximum value of the magnetic energy, that is, the magnitude of the mutual-inductance M in inductance motors. The magnitude of the magnetic energy generated by the mutual-inductance M is expressed by $M \times I_1 \times I_2$. In inductance motors, the first current $I_1$, is proportional to the secondary current I2. Therefore, the magnetic energy can be expressed by $M \times I_1 \times I_2 = M \times \text{current } I^2$. $I^2$ where I represents the total current.

Since the copper loss is a resistance loss, it can be expressed by $R \times I^2$. Therefore, the proportional constant that determines the relationship between the torque and the copper loss is torque/copper loss. Consequently, the proportional constant can be expressed by M/R.

Considered next are the factors that determine the mutual-inductance M and copper loss (resistance loss) R. Eliminating the factor, the number of winding turns of coil, which affects equally M and R, M can be mainly expressed by the primary-secondary facing surface S and the air gap length, g. R is mainly determined by a coil cross-sectional surface A and the coil length, I, per winding turn. Considering that the air gap length, g, is mostly fixed, the above mentioned proportional constant can be expressed by only main components as follows:

S×A/I=S/coil component

It is understood that improving the main components constituting the proportional constant to increase the proportional constant value enhances the motor s property, resulting in improving the efficiency value.

Observing the proportional constant in conventional products, one finds that conventional inductance machines have a drawback. In other words, the common factor to determine the numerator of the formula for the proportional constant is the primary-secondary magnetic facing surface S. The more the facing surface S is enlarged, the higher the proportional constant and efficiency value become.

It is understood, however, from the example of the three-phase inductance motor (see FIG. 18) which is a typical rotating electric machine, that the ratio of the height H3 of the primary-secondary magnetic-facing portion with respect to the entire motor height H2 in the axial direction is extremely small. This is because, as described before, the winding height H1 occupies much of the axial space. As a result, the above mentioned magnetic-facing surface S is extremely small.

If, without changing the condition of the coil component, the magneticfacing surface can fill the axial motor space fully, the above mentioned proportional constant can be greatly improved. This can easily reduce the loss in the same torque (or output) to ½ or ⅓, for example.

This condition is possibly created depending on the structure. In other words, it is structurally possible to increase the height of the primary-secondary magnetic facing surface to a great extent without degrading the coil component. By employing such a structure, it is possible to greatly increase the efficiency value and decrease the loss.

FIG. 20 shows the relationship between the outputs (horizontal axis) and the efficiency values (vertical axis) of practical inductance motors. Each chart respectively indicates standard values and measured values for a high-efficiency motor. The deviations of the efficiency value depending on the output are caused due to the variation of the proportional constant affected by the size. The high efficiency motor seeks after high efficiency by increasing the space factor of the winding or using silicon steel sheets of low iron loss. The basic structure of the high efficiency motor is the same as one of FIG. 18, in which the axial space is not fully used and the primary-secondary facing surface S remains small. If, assuming that all the loss is a copper loss, the height of the axially facing surface is made three times higher while the coil component is maintained the same, it is understood from FIG. 20 that the efficiency value, 60%, goes up to 82%, and 80% to 92%, resulting in a great improvement.

According to the present invention, the facing surface of the core of the primary armature or the secondary armature is made higher than the core height of the core winding portion to optimally use the space in the height direction, which has been the drawback of the conventional structure. Because the coil component is not degraded, the above mentioned proportional constant can be greatly improved. Consequently, the loss will be decreased, thus remarkably improving the efficiency value.

By elongating the facing core portion in the radial direction for projection, the magnetic flux lines in the lamination (axial) direction become smooth, the fixing strength of the core is increased, and the fixing and positioning the core to the outer frame is facilitated.

Embodiments of the present invention will be described in detail based on the drawings.

BRIEF DESCRIPTION OF THE DRAWINGS

In the drawings:

FIG. 1 is a schematic half vertical cross-sectional view showing the structure of a toroidal winding type inductance motor of an embodiment of the present invention;

FIG. 2 is a schematic horizontal cross-sectional view of the toroidal winding type inductance motor illustrated in FIG. 1;

FIG. 3 is a perspective outlook of a structure of a stator in FIGS. 1 and 2;

FIG. 4 is a perspective outlook of a structure of a laminated core constituting a core of the stator illustrated in FIG. 3;

FIG. 7 is a schematic and perspective outlook of a structure of a rotor used in the toroidal winding type inductance motor illustrated in FIG. 1;

FIG. 8 is a schematic vertical cross-sectional view showing another embodiment of the laminated core of the present invention;

FIG. 9 is a plan view of the laminated core illustrated in FIG. 8;

FIG. 10 is a schematic vertical cross-sectional view of another embodiment of the laminated core of the present invention;

FIG. 11 is a schematic vertical cross-sectional view of an embodiment in which the present invention is applied to a surface-facing type rotating electric machine;

FIG. 12 is a plan view of the surface-facing rotating electric machine illustrated in FIG. 11;

FIG. 13 is a perspective outlook showing an armature structure of a stator of an inductance motor of another embodiment of the present invention;

FIG. 14 is a partial plan view of the laminated core illustrated in FIG. 13;

DESCRIPTION OF THE PREFERRED EMBODIMENTS

Figure 5:
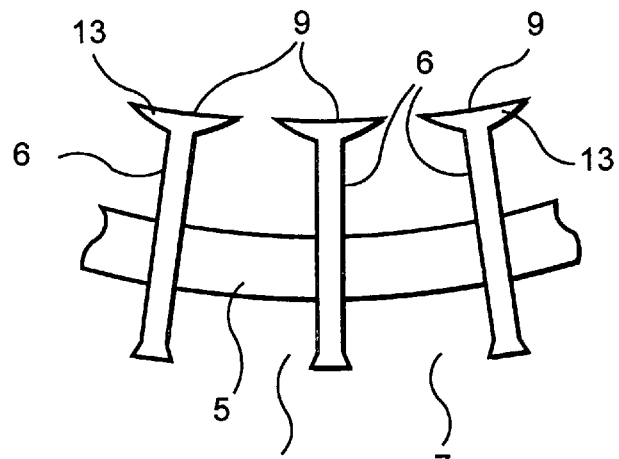
FIG. 5 is a plan view of the structure of the laminated core of the stator illustrated in FIG. 3.

In an embodiment illustrated in FIGS. 1 through FIG. 5, the present invention is applied to a stator and a rotor in an inductance motor. A stator 2 attached to an inner circumferential wall of a stator frame 1 is arranged to surround an outer circumference of a rotor 4 fixed to a rotary shaft 3. A core constituting the stator 2 is formed of a laminated core. To an annular core portion 5 constituting a core winding portion of the laminated core, a plurality of rib-like core portions 6 are integrally formed such that they extend radially and are spaced at a predetermined interval in the circumferential direction. Also, a coil 8 is wound with a so-called toroidal winding around the annular core portion 5 within each slot 7 created between a pair of rib-like core portions 6 which are adjacent in the circumferential direction. At the inner edge portion of each rib-like core portion 6, a facing core portion 9 that faces the rotor 4 is formed.

Figure 6A:
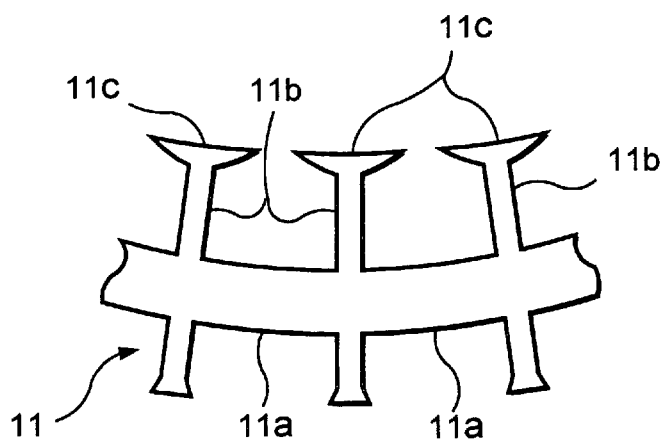
FIG. 6(a) and FIG. 6(b) are is a plan view of a shape of a core piece that constitutes the laminated core illustrated in FIGS. 4 and 5.
Figure 6B:
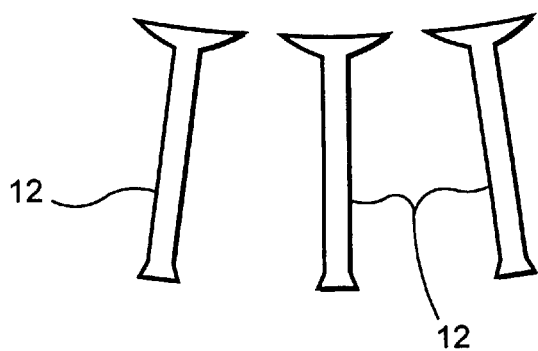

The laminated core constituting the core is made by laminating core pieces of silicon copper sheets that are punched out in a predetermined shape, wherein partial core pieces 12 as illustrated in FIG. 6(b) are further laminated over a lamination base of an integral core piece 11 as illustrated in FIG. 6(a). In other words, the lamination base of integral core piece 11 constitutes an axially central portion of the laminated core, and comprises an annular core 5 forming portion 11a, a rib-like core 6 forming portion 11b that extends in the radial direction from the annular core portion 5, and a facing core (magnet pole) 9 forming portion 11c that is formed at the inner edge portion of the rib-like core portion 6. A predetermined number of the integral core pieces 11 in the shape as illustrated in FIG. 6(a) are laminated in the axial direction to form the annular core portion 5, the rib-like core portion 6, and the facing core portion (magnet pole portion) 9 in a predetermined height. A coil 8 is wound with a toroidal winding around the annular core portion 5 made by laminating the integral core piece 11.

The partial core piece 12 illustrated in FIG. 6(b) consists of the rib-like core portion 6 and facing core portion (magnet pole portion) 9 but not the annular core portion 5. The partial core piece 12 is further laminated axially at both ends of the rib-like core portion 6 and facing core portion (magnet pole portion) 9 of the lamination base of integral core piece 11 to form the partial laminating core 13. The partial core piece 12 constituting the partial laminating core 13 is superposed to further heighten the rib-like core portion 6 and facing core portion 9 of the integral core piece 11. The partial laminating core 13 is fixed by a lamination caulking 14.

The partial laminating core 13 enlarges the axially facing surface which faces the rotor 4. The total lamination thickness in the axial direction (lamination direction) of the partial laminating core 13 and facing core portion 9 is larger than the thickness of the annular core portion 5. Also, the total lamination thickness of the facing core portion 9 and partial laminating core 13 is larger than the axial winding height of the coil 8.

On the other hand, as described later, the core height, the axial (lamination direction) thickness, of the facing surface of the rotor 4 is larger than the core height, the thickness, of the annular core portion 5, which is nearly the same as the aforementioned total lamination thickness. With this configuration, the partial laminating core 13 is confronted to the rotor 4.

A laminated core constituting the core of the rotor 4 uses the same structure as the laminated core of the stator 2. In particular, as illustrated in FIG. 7, a plurality of rib-like core portions 16 are integrally formed to an annular core portion 15 of the rotor 4 such that they extend radially and are spaced at a predetermined interval in the circumferential direction; a conductive portion (not illustrated) formed of an aluminum die casting is filled in each slot created between a pair of rib-like core portions 16 that are adjacent in the circumferential direction. At the radially outer edge portion of each rib-like core portion 16, a facing core portion 17 is formed to face the stator 2.

At the inner circumferential portion of the aluminum die casting in the conductive portion, that is, at the edge portion on the opposite side of the facing core portion 17, a cylindrical ring-shaped copper plate 18 is provided to form a conductive portion, and whereby excellent conductivity is provided. To increase conductivity of the conductive portion, a bar-like copper material may be inserted in each slot or the entire conductive portion may be made of copper material.

The above mentioned laminated core is made by axially laminating the core pieces of silicon steel plate which are punched out in a predetermined shape. On the lamination base of the integral core piece 11 in the shape as illustrated in FIG. 6(a), the partial core piece 12 in the shape as illustrated in FIG. 6(b) is further laminated. In other words, the lamination base of integral core piece 11 constitutes the axially central portion of the above mentioned laminated core, and consists of the annular core 15 forming portion, the rib-like core 16 forming portion that radially extends from the annular core portion 15, and the facing core portion (magnet pole portion) formed at the inner edge portion of the rib-like core portion 16. By axially laminating a predetermined number of the integral core pieces 11 in such a shape, the annular core portion 15, rib-like core portion 16, and facing core portion (magnet pole portion) 17 are formed in a predetermined height.

On the other hand, the partial core piece 12 consists of the rib-like core portion 16 and facing core portion (magnet pole portion) 17 but not the annular core portion 15. The partial core piece 12 is further laminated axially at both ends of the rib-like core portion 16 and facing core portion (magnet pole portion) 17 of the lamination base of integral core piece 11, and fixed by the lamination caulking 14. The partial core piece 12 is superposed to further heighten the rib-like core portion 16 and facing core portion 17 of the integral core piece 11. With this structure, a partial laminating core 21 consisting of a lamination base of the partial core piece 12 is formed.

The partial laminating core 21 enlarges the surface facing the stator 2 in the axial direction. The core height (the total lamination thickness) of the partial laminating core 21 and facing core portion 17 in the axial direction (lamination direction) is larger than the core height (the thickness) of the annular core portion 15. Also, the total lamination thickness of the facing core portion 17 and partial laminating core 21 is nearly the same as the axial height of the conductive portion.

The partial core piece 12, which constitutes the partial laminating core 13 and 21 respectively at the stator 2 and the rotor 4, may be made of silicon steel plate with no insulation coating, if needed, to improve the flow of the magnetic flux in the lamination direction (axial direction).

Formed at the laminated core of the stator 2 is a projecting core portion 25 that projects outward in the radius direction from the annular core portion 5. The projecting core portion 25 is abutted to the stator frame 1 to fix the entire stator.

In another embodiment illustrated in FIGS. 8 and 9, provided at the partial laminating core 32 laminated on the facing core portion of a stator 31 is the axially facing surface 32a as well as the radially facing surface with resect to the rotor 33. The facing area is increased with these facing surfaces. The axially facing surface 32a at the partial laminating core 32 is enlarged by being extended in either the circumferential direction or the radius direction, and also provided in pair sandwiching the rotor 33 in the axial direction.

In another embodiment illustrated in FIG. 10, the axially facing surface 34a is provided on the rotor 34 side.

In an embodiment illustrated in FIGS. 11 and 12, the present invention is applied to a so-called surface-facing type rotating electric machine, wherein a topmost core portion 43 of the partial laminating core is axially confronted with the member on the other side.

In an embodiment illustrated in FIG. 13, the present invention is applied to a stator of an inductance motor. Inside an inner circumference of an annular core portion 51a of a laminated core 51 constituting an core attached to an inner circumferential wall of a stator frame (not illustrated), a plurality of radial rib-like core portions 51b are integrally formed such that they extend radially and are spaced at a predetermined distance in the circumferential direction. Also, slots are created between circumferentially adjacent radial rib-like core portions 51b, and a coil 52 attached inside each slot is wound with a distributed winding about each of the radial rib-like core portions 51b. At the radially inner side of each of the radial rib-like core portions 51b, a facing core portion (magnet pole portion) 51c that faces a rotor (not illustrated) is formed.

As mentioned above, the laminated core 51 consists of the annular core portion 51a, the radial rib-like core portion 51b, and the facing core portion 51c. While the radial rib-like core portion 51b is formed integrally with the facing core portion 51c, as illustrated in FIG. 14, the radially outer side of the radial rib-like core portion 51b is formed separately from the annular core portion 51a. The coil 52 is first wound about the separate unit, the radial rib-like core portion 51b, and then, a protruding portion 51d, which is formed at the radially outer edge of the radial rib-like core portion 51b and formed to fit in a recess portion 51e formed in the annular core portion 51a, is coupled for engagement.

The facing core portions 51c adjacent in the circumferential direction are connected to one another to constitute an integral annular member. A core piece constituting each layer of the facing core portion 51c is made of a plate-like member which is a single unit in the circumferential direction. With this structure, even when partial laminating cores 53 (to be described next) are laminated on the facing core portion 51c, a sufficient mechanical strength can be maintained.

The laminated core 51 is made by axially laminating core pieces of silicon steel plates that are punched out in a predetermined shape, and consists of a lamination base in which core pieces as illustrated in FIG. 14 are laminated in a predetermined height. Core pieces in a shape corresponding to that of the facing core portion 51c are further laminated on the facing core portion 51c of the lamination base in a predetermined height. In other words, the lamination base of the core pieces having the radial rib-like core portion 51b and the facing core portion 51c constitutes an axially central portion of the laminated core 51. The partial laminating core 53 is laminated axially at both ends of the portion corresponding to the facing core portion 51c of the lamination base. The core pieces constituting the partial laminating core 53 and the laminated core 51 are fixed by a lamination caulking 54.

The partial laminating core 53 enlarges the axially facing surface which faces the rotor (not illustrated). The total lamination thickness (the core height) in the axial direction (lamination direction) of the partial laminating core 53 and the facing core portion 51c is larger than the thickness of the radial rib-like core portion 51b. Also, the total lamination thickness (core height) of the facing core portion 51c and partial laminating core 53 is larger than the axial winding height of the coil 52. The facing core portion 51c is formed such that the end surface 51cc thereof, continuous to the radial rib-like core portion 51b, extends perpendicular to the projecting direction (radial direction) of the radial rib-like core portion 1b or in the circumferential direction, whereby a passing area of a magnetic path to be formed in the axial direction will be enlarged.

On the other hand, the axial (lamination direction) core height of the facing surface of the rotor is larger than the core height of the radial rib-like core portion 51b and nearly the same as the aforementioned total lamination thickness. With this configuration, the partial laminating core 53 is confronted to the rotor. In addition, the lamination thickness of the annular core portion 51a is larger than the thickness of the radial rib-like core portion 51b so that the axial height can be heightened and the radial thickness can be thinned.

Figure 15:
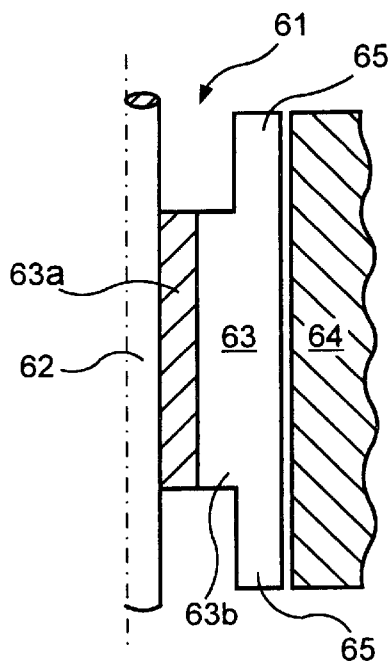
FIG. 15 is a schematic vertical cross-sectional view of an embodiment in which the present invention is applied to an inductance type rotating electric machine.
Figure 16:
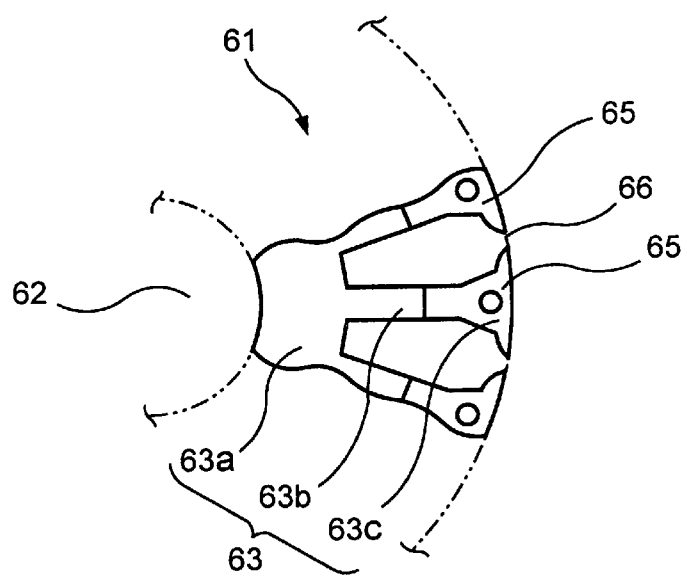
FIG. 16 is a partial plan view of the rotor illustrated in FIG. 15.

Such a structure can be adopted to a rotor 61 of an inductance machine in the same manner, as illustrated in FIGS. 15 and 16.

That is, as illustrated in the same figures, a plurality of rib-like core portions 63b are integrally formed with an annular core portion 63a of a laminated core 63, which is a core, fixed to a rotary shaft 62 such that they extend radially and are spaced at a predetermined interval in the circumferential direction; a conductive portion (not illustrated) formed of an aluminum die casting is filled partially or entirely in each slot created between the rib-like core portions 63b that are adjacent in the circumferential direction. At the radially outer edge portion of each rib-like core portion 63b, a facing core portion 63c (magnetic pole portion) is formed to face a stator 64.

The laminated core 63 as the core is made by axially laminating the core pieces of silicon steel plate which are punched out in a predetermined shape. On the facing core portion 63c that is the lamination base, for which the core pieces in the shape as illustrated in FIG. 16 are layered in a predetermined height, the core pieces in the shape corresponding to that of the facing core portion 63c is further laminated. In other words, the lamination base of the core piece having the radial rib-like core portion 63b and facing core portion 63c constitutes the axially central portion of the laminated core 63, and the partial laminating core 65 is further laminated axially at both ends of the facing core portion 63c of the lamination base. The core pieces constituting the partial laminating core 65 and the laminated core 63 are fixed by a lamination caulking. It is desirable that the partial laminating core 65 at this time may be extended from the facing core portion 63c to the radial rib-like core portion 63b.

The partial laminating core 65 enlarges the surface facing the stator 64 in the axial direction. The total lamination thickness (the core height) of the partial laminating core 65 and the facing core portion 63c in the axial direction (lamination direction) is larger than the thickness (the core height) of the radial rib-like core portion 63b. Even when an insulation slit for reducing the leakage of the magnetic flux is formed between the facing core portions 63c that are adjacent in the circumferential direction, a sufficient mechanical strength can be obtained due to the annular core portion 63a. Note that the partial laminating core 65 is formed such that the adjacent laminating cores 65 are connected with each other to increase the strength.

On the other hand, in a rotor 61 of such a inductance machine, it is possible that an electrically connected ring (an end ring) made of a copper material is provided at both ends of the conductive portion and the conductive portions are connected to form a closed circuit. The electrically connected ring (the end ring) can be formed by laminating the press-formed copper material. In this case, a bar-like copper material can be inserted to the slot portion of the armature to make a part of the conductive portion.

Although the embodiments of the present invention by the present inventor has been described specifically above, it should be understood that the present invention is not limited to the above embodiments, but is modifiable within the scope thereof.

Figure 17:
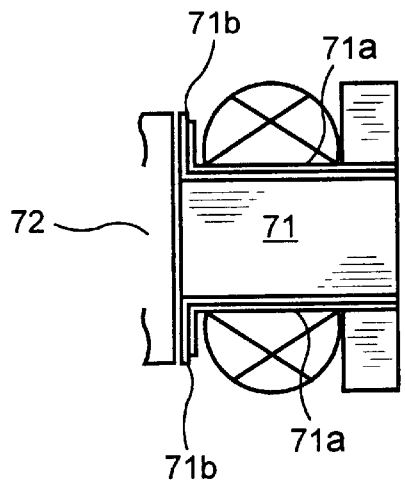
FIG. 17 is a schematic side view of the embodiment in which the ore of the present invention employs a magnetic flux collecting yoke structure.
Figure 18:
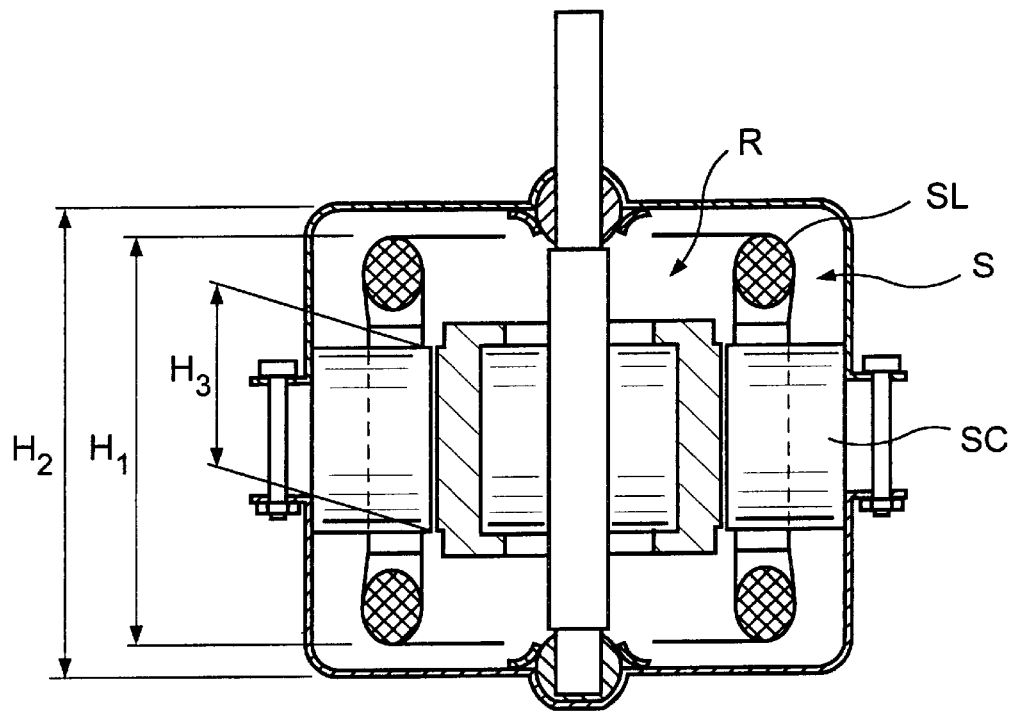
FIG. 18 is a vertical cross-sectional view of a structural example of a conventional inductance rotating electric machine.
Figure 19:
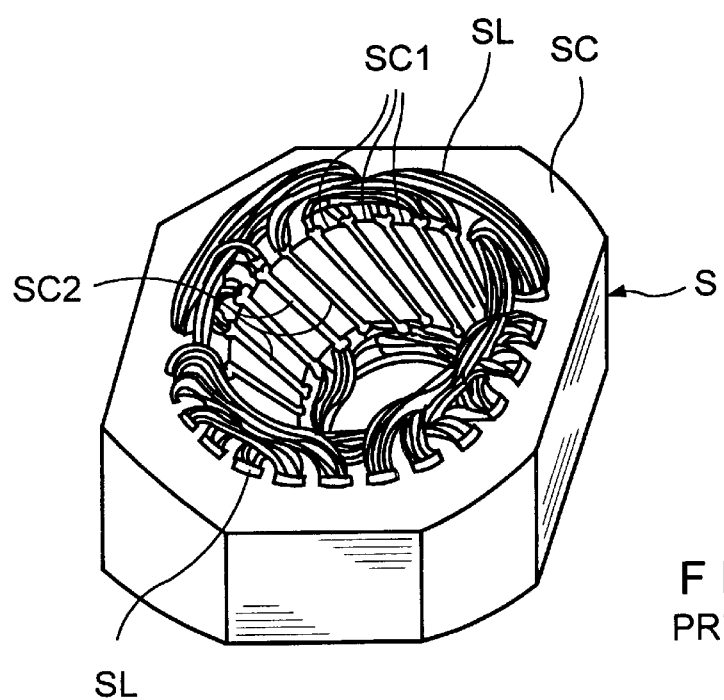
FIG. 19 is a perspective outlook showing the winding structure of the inductance rotating electric machine illustrated in FIG. 18.
Figure 20:
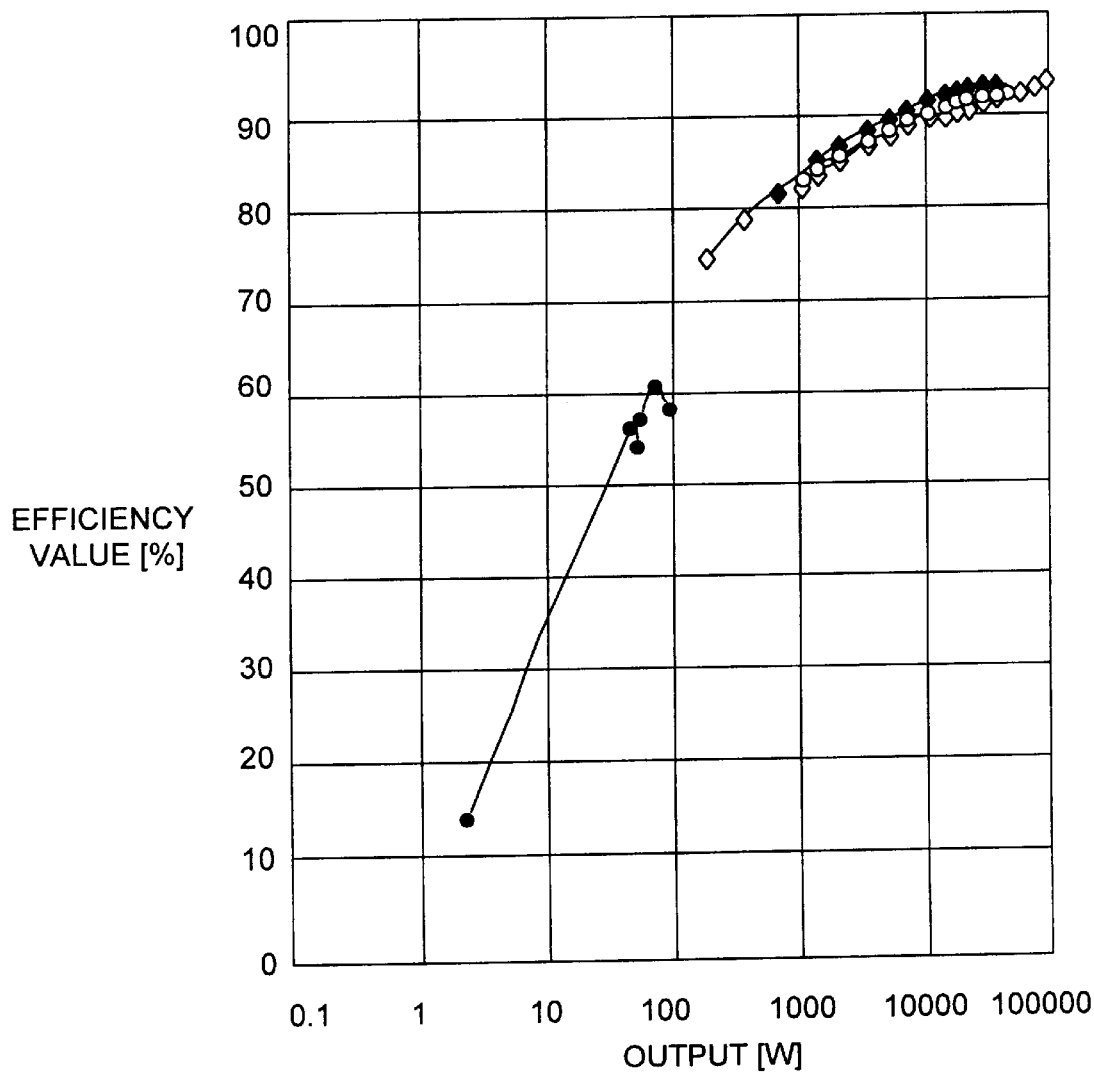
FIG. 20 is a property chart of output-efficiency value of conventional high efficiency motors.

For example, in an embodiment illustrated in FIG. 17, a double-layered core piece 71a arranged at both ends in the lamination direction of the laminated core 71 constituting a core is bent perpendicular at the portion corresponding to the facing core portion 71b to be open in the core height direction, that is, lamination direction (up and down direction in the figure). With this, a magnetic flux collecting yoke structure is formed to enlarge the surface facing a member 72 on the opposite side. With such a magnetic flux collecting yoke structure, the same operation and effects can be obtained.

In the embodiment illustrated in FIG. 17, although the double-layered core pieces 71 provided at both ends in the lamination direction are bent, it is possible to make a magnetic flux collecting yoke structure by bending the single-layered core pieces or the triple- or more-layered core pieces provided at both ends of the laminated core 71. By using such a magnetic flux collecting yoke structure consisting of multiple-layered core pieces, the saturation of the magnetic flux caused by magnet collection can be prevented.

Although not illustrated, the core may be formed of a sintered unit of magnetic powder to make a magnetic powder yoke structure so that the primary-secondary facing core height can be increased.

Although, in each of the above embodiments, the present invention is applied to an inner rotor type, it may be applied to an outer rotor type.

In the same manner, the present invention can be applied to, not only the motors of the above embodiments, but also to generators.

As described above, according to the present invention, the facing surface of the core of the primary armature or the secondary armature is made higher than the core height of the core winding portion to fully utilize the space in the height direction, which is a drawback of the conventional structure. Also, as the coil component will not be degraded, the proportional constant that determines the relationship between the torque and the copper loss is greatly improved. Thus, the loss is remarkably reduced, resulting in greatly improving the efficiency value and property of the rotating electric machine.

While the foregoing description and drawings represent the preferred embodiments of the present invention, it will be obvious to those skilled in the art that various changes and modifications may be made therein without departing from the true spirit and scope of the present invention.

What is claimed is:

1. An inductance rotating electric machine comprising:
    a primary armature having a core that includes a core winding portion, said core winding portion including an annular core member having an annular core portion, to said annular core portion a coil is wound with a toroidal winding;
    a coil being wound within a slot; and
    a facing core portion, which faces a secondary armature at a projection end of said core winding portion;
    said facing core portion having a core height which is higher than that of said core winding portion, the core height at the facing surface of said core of the secondary armature being higher than that of said annular core portion of said core winding portion.

2. The inductance rotating electric machine as set forth in claim 1 wherein the core height at the facing surface of said facing core portion is formed to be equal to or higher than the coil winding height of said core winding portion.

3. The inductance rotating electric machine as set forth in claim 1 wherein the core height at a facing surface of said core of secondary armature is to be equal to or higher than the core height of said facing core portion of said primary armature.

4. The inductance rotating electric machine as set forth in claim 3 wherein said secondary armature includes a conductive portion, and the core height of said facing core portion of said secondary armature which faces said primary armature is higher than the core height of the conductive portion of said secondary armature.

5. The inductance rotating electric machine as set forth in claim 4 wherein said core winding portion in said primary armature or said secondary armature consists of an annular core member, to which a coil is wound with a toroidal winding, said secondary armature having a core that includes a core winding portion.

6. The inductance rotating electric machine as set forth in claim 5 wherein a partial laminating core is laminated on portions other than said core winding portion to enlarge the surface facing an opposite member, and the total core height of said facing core portion and said partial laminating core portion is larger than the core height of said core winding portion.

7. The inductance rotating electric machine as set forth in claim 6, wherein said partial laminating core is laminated with a plurality of partial laminating cores, each of said partial laminating cores being integrally formed with said facing core portion and the rib-like core portion.

8. The inductance rotating electric machine as set forth in claim 5 wherein said core is formed of a magnetic powder.

9. The inductance rotating electric machine as set forth in claim 4 wherein said rotating electric machine uses an inner rotor structure.

10. The inductance rotating electric machine as set forth in claim 4 wherein said rotating electric machine uses an outer rotor structure.

11. An inductance rotating electric machine comprising:
    a primary armature having a core that includes a core winding portion;
    a coil being wound within a slot;
    a facing core portion, which faces a secondary armature at a projection end of said core winding portion;
    said core winding portion consisting of an annular core member to which a coil is wound with a toroidal winding;
    a partial laminating core being laminated on portions other than said core winding portion consisting of said annular core member; and
    said partial laminating core that faces a member having a core width which is larger than that of said core winding portion to enlarge the surface axially facing said member.

12. An inductance rotating electric machine comprising:
    a primary armature having a core that includes a core winding portion;
    a coil being wound within a slot; and
    a facing core portion, which faces a secondary armature at a projection end of said core winding portion,
    said facing core portion having a core height which is higher than that of said core winding portion,
    the core height at a facing surface of said core of secondary armature being equal to or higher than the core height of said facing core portion of said primary armature,
    said secondary armature including a conductive portion, the core height of said facing core portion of said secondary armature which faces said primary armature being higher than the core height of the conductive portion of said secondary armature,
    said core winding portion in said primary armature or said secondary armature consisting of an annular core member, to which a coil is wound with a toroidal winding,
    wherein core pieces laminated to constitute both end surfaces of said core in the core height direction are bent to extend in the core height direction so that a magnetic flux collecting yoke structure is formed.

13. An inductance rotating electric machine comprising:
    a primary armature having a core that includes a core winding portion;
    a coil being wound within a slot; and
    a facing core portion, which faces a secondary armature at a projection end of said core winding portion,
    said facing core portion having a core height which is higher than that of said core winding portion,
    the core height at a facing surface of said core of secondary armature being equal to or higher than the core height of said facing core portion of said primary armature, said secondary armature including a conductive portion, the core height of said facing core portion of said secondary armature which faces said primary armature being higher than the core height of the conductive portion of said secondary armature, said core winding portion in said primary armature or said secondary armature consisting of an annular core member, to which a coil is wound with a toroidal winding, wherein core pieces laminated to constitute both end surfaces of said core in the core height direction and core pieces in multiple layers that are adjacent to said core pieces at both ends are bent to extend in the core height direction so that a magnetic flux collecting yoke structure is formed.

14. An inductance rotating electric machine, comprising:

a primary armature having a core that includes a core winding portion;

a coil being wound within a slot; and a facing core portion, which faces a secondary armature at a projection end of said core winding portion, said facing core portion having a core height which is higher than that of said core winding portion, the core height at a facing surface of said core of secondary armature being equal to or higher than the core height of said facing core portion of said primary armature, said secondary armature including a conductive portion, the core height of said facing core portion of said secondary armature which faces said primary armature being higher than the core height of the conductive portion of said secondary armature, said core winding portion in said primary armature or said secondary armature consisting of an radial rib-like core member that extends radially, a coil being wound with a distributed winding about said core winding portion consisting of said radial rib-like core member, wherein core pieces laminated to constitute both end surfaces of said core in the core height direction are bent to extend in the core height direction so that a magnetic flux collecting yoke structure is formed.

15. An inductance rotating electric machine, comprising:

a primary armature having a core that includes a core winding portion;

a coil being wound within a slot; and a facing core portion, which faces a secondary armature at a projection end of said core winding portion, said facing core portion having a core height which is higher than that of said core winding portion, the core height at a facing surface of said core of secondary armature being equal to or higher than the core height of said facing core portion of said primary armature, said secondary armature including a conductive portion, the core height of said facing core portion of said secondary armature which faces said primary armature being higher than the core height of the conductive portion of said secondary armature, said core winding portion in said primary armature or said secondary armature consisting of an radial rib-like core member that extends radially, a coil being wound with a distributed winding about said core winding portion consisting of said radial rib-like core member, wherein core pieces laminated to constitute both end surfaces of said core in the core height direction and core pieces in multiple layers that are adjacent to said core pieces at both ends are bent to extend in the core height direction so that a magnetic flux collecting yoke structure is formed.

16. An inductance rotating electric machine, comprising:

a primary armature having a core that includes a core winding portion;

a coil being wound within a slot; and a facing core portion, which faces a secondary armature at a projection end of said core winding portion, said facing core portion having a core height which is higher than that of said core winding portion, the core height at a facing surface of said core of secondary armature being equal to or higher than the core height of said facing core portion of said primary armature, said secondary armature including a conductive portion, the core height of said facing core portion of said secondary armature which faces said primary armature being higher than the core height of the conductive portion of said secondary armature, said primary armature or said secondary armature consisting of a partial laminating core, which is laminated on portions other than said core winding portion to enlarge the surface facing one of a member located opposed from said partial laminating core and a core having a magnetic powder yoke structure; wherein a radially facing surface and an axially facing surface that respectively face said member in radial direction and axial direction are formed at said facing core portion.

17. The inductance rotating electric machine as set forth in claim 16 wherein the surface axially facing said member on the opposite side is formed axially at both ends of said primary armature or said secondary armature.

* * * * *